Nov. 29, 1960    F. O. SKIDMORE    2,962,072
PNEUMATIC TIRE AND METHOD OF MAKING THE SAME
Filed April 27, 1959

INVENTOR.
FRANK O. SKIDMORE
BY
ATTORNEYS

United States Patent Office 2,962,072
Patented Nov. 29, 1960

2,962,072
PNEUMATIC TIRE AND METHOD OF MAKING THE SAME

Frank O. Skidmore, 2513 3rd St., Cuyahoga Falls, Ohio

Filed Apr. 27, 1959, Ser. No. 809,314

6 Claims. (Cl. 152—209)

It is well recognized that conventional vehicle tires of pneumatic type, while having sufficient frictional properties under dry road conditions, are apt to slip or skid upon coming in contact with wet or moist surfaces.

Many attempts have been made to produce a tire which is less likely to skid by the employment of peculiar and novel shaped tread designs, but such tread constructions have not been as successful as desired and many of these types of tread design create objectionable noises and some have rough riding qualities while in operation.

(1) My invention relates to tire treads and has for its primary object the production of an improved tire tread which shall have greater non-skid features than those presently now in use and without the aforementioned objectionable features.

(2) The invention, together with its objectives and advantages will best be understood by study of the following description and accompanying drawings wherein it is illustrated (see Figures 1, 2, and 3 of attached drawings).

(3) A further object of my invention is to produce a simple and inexpensive method of increasing the tire-to-road traction of conventional vehicle tires regardless of the tread design used and still be exceedingly effective for the purpose intended.

(4) Another object of my invention is to enable the production of a vehicle tire in which the tread itself is provided with an inexpensive, simple and efficient device inserted into such tire tread, causing said tire to have greater non-skid and non-slip qualities.

(5) Another object of my invention is to provide a vehicle tire with the tread portion having the combined advantages of a higher coefficient of friction for wet and slippery surfaces and having no objectionable noises while in operation.

Figure 1:
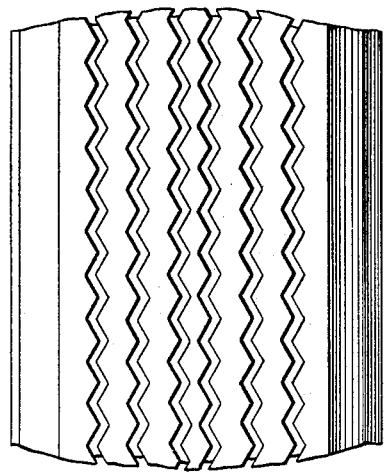
Figure 1 is a fragmentary plan view of a pneumatic tire of any ordinary tread design without the button formation of my invention.
Figure 2:
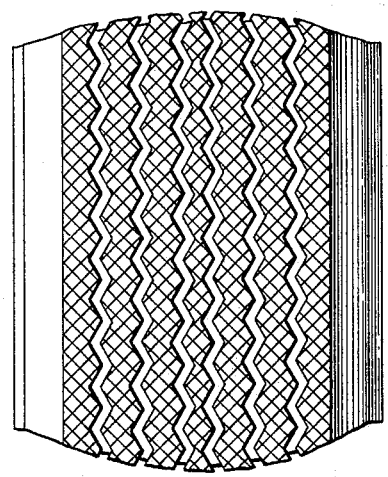
Figure 2 is a fragmentary plan view of a pneumatic tire of ordinary design but having applied thereto the buttons of my invention positioned on a bias and extending to the greatest depth of the mold design.
Figure 3:
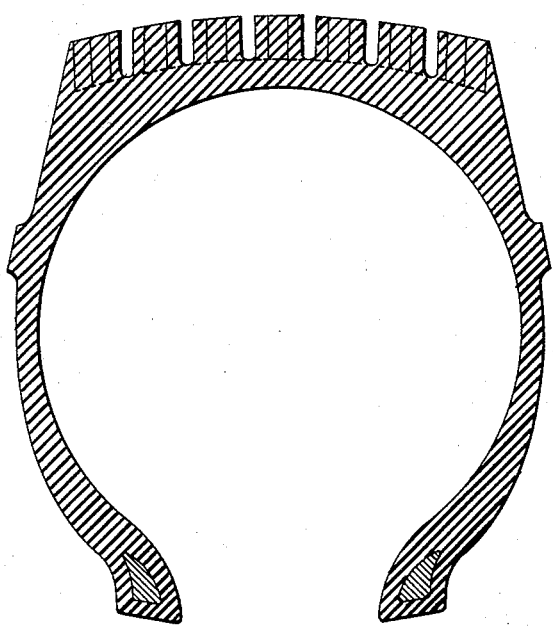

Figure 3 is a cross-section view of a pneumatic tire showing separations between the tread design and between buttons. These buttons, while being separated to the full tread depth, nevertheless give a solid appearance to the tread design since the displacement of stock between them is relatively narrow and is shown merely as a line. The buttons ride almost shoulder to shoulder and give the appearance of having been cut or slit with a knife.

The foregoing objectives of the invention are achieved by the process of applying a bias-cut or straight cut strip of any form of scrim or netting of either natural or synthetic fibers and of a width about equal to the tread width to the surface of the tread stock of a vehicle tire before said tire is placed in the curing mold. Not fully equivalent results, but certain of the advantages of the invention are obtained by use of scrim or netting made from metal strands, fibers or cable. Before being applied to the tire this scrim or netting is treated with a lubricating plastic material, such as silicon, water dispersant butyl or other material incompatible with rubber, which will impregnate or coat said scrim or netting.

Said scrim or netting to be so designed that in the curing of said tire upon which it has been applied it forms a plurality of tread buttons numbering in most instances several thousand.

The forming of the buttons is achieved by the scrim or netting being forced into the tread stock in the process of curing the tire by the softening of the tread rubber due to heat and the internal pressure in the tire. Actually the ribs of the tread design in the curing mold engage with the scrim or netting and press the scrim or netting into the tread to a position near the base thereof and to a distance about equal to the depth of the grooves molded into the tire tread by the tread design in the mold.

The lubricant above referred to coats the walls of the buttons, maintaining the separation and preventing the re-bonding of the buttons to each other during the time of the curing process of the tire. It will be recognized that the buttons are formed in the tread of the tire in addition to the regular tread design, and that each button is made, in effect, by the extrusion of the hot, softened, unvulcanized tread rubber through the openings in the scrim or netting as the scrim or netting is forced down through the tread. Thus, each button ends up having a cross section substantially identical to the opening through the scrim or netting through which it has been pressed, the lateral distance between the buttons is equal to the thickness of the cord forming the scrim or the strand element forming the netting, and each button extends through the opening in the scrim and is cured to the base of the tread and to the tire carcass.

The subject of this invention is equally as adaptable to new tire construction as to retreading of pneumatic tires, and may be used in any existing mold regardless of the tread design and thus adds to the efficiency of, but does not change the general appearance of said tread design.

What is claimed is:

1. That method of making a pneumatic tire which includes the steps of building a tire carcass complete with tread and sidewalls, applying over the outer periphery of the tire tread and to the width of approximately the shoulders thereof a strip of scrim coated with water dispersant butyl, placing the tire in the vulcanizing mold, applying heat to the tire, applying pressure internally of the tire to press the tread portion of the tire radially outward into the tread design of the mold, the tread design of the mold holding the scrim so that the unvulcanized rubber of the tread is pressed outwardly through the openings in the scrim to form a plurality of traction buttons in the tread of the tire, the scrim ending up in the tire substantially at the base of the tread, the butyl of the scrim coating the sides of the traction buttons so that the sides of the buttons do not vulcanize together in the curing operation, completing the cure of the tire, and removing the tire from the mold.

2. That method of making a tire which includes the steps of building a tire carcass complete with tread and sidewalls, applying over the outer periphery of the tire tread and to the width of approximately the shoulders thereof a strip of netting coated with a plastic lubricating material not curable to rubber, placing the tire in the vulcanizing mold, applying heat to the tire, applying pressure internally of the tire to press the tread portion of the tire radially outward into the tread design of the mold, the tread design of the mold holding the netting so that the unvulcanized rubber of the tread is pressed outwardly through the openings in the netting to form a plurality of traction buttons in the tread of the tire, the scrim ending up in the tire substantially at the base of the tread, completing the cure of the tire, and removing the tire from the mold.

3. That method of making a pneumatic tire which includes the steps of coating scrim with a lubricating plastic incompatible with rubber, forcing the scrim radially inwardly through the tread portion of the tire during the vulcanization of the tire to the depth of the tread design to form a plurality of buttons in the tire tread of substantially the cross-sectional size of the openings in the scrim and coated on their sides with the plastic, and and completing the vulcanization of the tire to form the regular tread design on the tire but without fusing the buttons together side by side.

4. That method of making a tire which includes the steps of coating scrim with a water dispersant butyl incompatible with rubber, forcing the scrim radially inwardly through the tread portion of the tire during the vulcanization of the tire to form a plurality of buttons in the tire tread of substantially the cross-sectional size of the openings in the scrim and coated on their sides with the water dispersant butyl, and completing the vulcanization of the tire to form the regular tread design on the tire but without fusing the buttons together side by side.

5. A pneumatic tire having a tread, a carcass, a strip of scrim position near the base of the tread over the full circumference thereof and at a depth about equal to the depth of the tread design and of a width about equal to the width of the tread, the tread of the tire being formed of a plurality of buttons each having a cross section substantially exactly of the shape of the openings through the scrim, each button being visibly contoured to said cross sectional shape by the passage of the scrim therethrough, there being a lateral clearance between adjacent buttons about equal to the thickness of the cords forming the scrim, the sides of the buttons having a coating of a water dispersant butyl incompatible with rubber thereon, each button extending through an opening in the scrim and connected to the carcass.

6. A pneumatic tire having a tread, a carcass, a strip of netting positioned near the base of the tread over the full circumference thereof, the tread of the tire being formed of a plurality of buttons each extending from the carcass up through the openings in the netting and having a cross section substantially of the shape of the openings through the netting, there being a lateral clearance between adjacent buttons about equal to the thickness of the strand element forming the netting.

References Cited in the file of this patent
UNITED STATES PATENTS

| | | |
|---|---|---|
| 2,121,955 | Eger | June 28, 1938 |
| 2,201,668 | Kraft | May 21, 1940 |
| 2,444,903 | Van Buren | July 6, 1948 |
| 2,622,052 | Chandler | Dec. 16, 1952 |
| 2,690,769 | Brown | Oct. 5, 1954 |
| 2,710,042 | Gates | June 7, 1955 |
| 2,716,435 | Herzegh | Aug. 30, 1955 |
| 2,816,853 | Meyer | Dec. 17, 1957 |